United States Patent [19]

Hodson

[11] Patent Number: 4,932,524
[45] Date of Patent: Jun. 12, 1990

[54] COMPUTER COVER

[76] Inventor: Richard H. Hodson, 900 W. Balboa Blvd., Newport Beach, Calif. 92661

[21] Appl. No.: 343,902

[22] Filed: Apr. 27, 1989

[51] Int. Cl.⁵ ....................... B65D 85/00; B65D 65/02
[52] U.S. Cl. ...................................... 206/320; 150/165
[58] Field of Search ................. 206/320; 150/154, 165

[56] References Cited

U.S. PATENT DOCUMENTS

| | | | |
|---|---|---|---|
| 2,467,471 | 4/1949 | Goldstein | 150/165 |
| 2,705,990 | 4/1955 | Miller | 150/165 |
| 4,006,764 | 2/1977 | Yamamoto et al. | 206/320 |
| 4,489,770 | 12/1984 | Reich | 206/320 |
| 4,658,956 | 4/1987 | Takeda et al. | 206/320 |
| 4,669,001 | 5/1987 | Thrush | 206/320 X |
| 4,782,873 | 11/1988 | Messner et al. | 150/154 |

Primary Examiner—William Price
Attorney, Agent, or Firm—Lyon & Lyon

[57] ABSTRACT

The present invention relates to a cover for computers which cover comprises a fabric member configured to conform to the general shape of the computer and which is sufficiently porous to permit effective heat dissipation and which is water resistant and static charge resistant. The fabric member contains at least one flap located in such a manner as to permit access to a disk drive access slot in the computer and which is capable of being closed after disk insertion and removal. The cover may also contain at least one opening which is located so as to permit access to external ports in the computer and to permit the cooling fan in the computer to vent without substantial interference.

3 Claims, 1 Drawing Sheet

COMPUTER COVER

BACKGROUND OF THE INVENTION

As home and office computers have come into widespread use, such computers have come to used in environments which are not carefully controlled and by users whose work habits are not conducive to a high degree of care. As a result, such home and office computers are subjected to dust-laden atmospheres, beverage spills and a variety of other adverse incidents that are the lot of any home or office appliance.

With the advent of the circumstances described above, a variety of protection devices for computers have appeared on the market. Among these are covers which can be draped over computers when they are not in use, but which must be removed when the computers are to be used. In addition, various types of plug-like devices have appeared, particularly those designed to cover disk drive access slots when the computer is not in use, but which, once again, must be removed during use.

However, at present, all known computer protective devices suffer from the deficiency that they must be removed in order to permit the computer to be used.

BRIEF DESCRIPTION OF THE INVENTION

The present invention comprises a computer cover which need not be removed during use because it is sufficiently "breathable" to permit effective heat dissipation and because it is provided with a flap over the disk drive access slot which may be opened to permit insertion (or removal) of a computer disk, but which may then be closed immediately after disk insertion and remain closed during computer use.

In its preferred embodiment, the computer cover of the present invention is also provided with at least one opening which is located so as to permit access to the external port or ports of the computer and to permit the cooling fan in the computer to vent without substantial interference.

It is an object of this invention to provide a computer cover which is light in weight, easy to install, can remain in place during computer operation without interfering with such operation and which will substantially reduce the vulnerability of a computer to a dust-laden atmosphere and liquid and other spills.

DETAILED DESCRIPTION OF A PREFERRED EMBODIMENT

Figure 1:
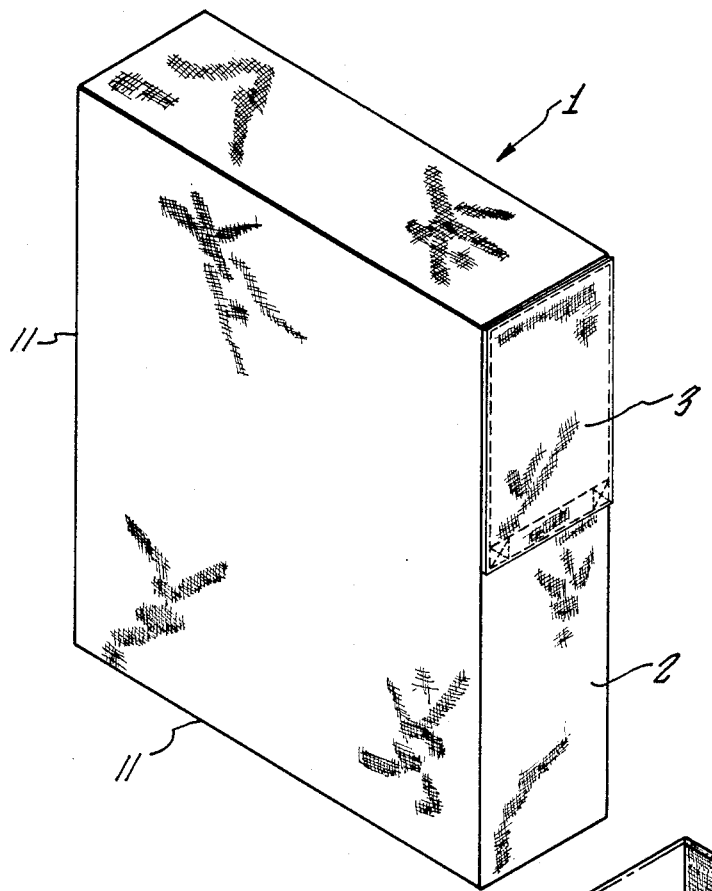
FIG. 1 shows the computer cover of the present invention in place over a computer and with its flap closed over a disk drive access slot.

As shown in FIG. 1, the computer cover of the present invention comprises a fabric member 1 which is configured in the shape of a typical computer. The specific shape of a computer cover made in accordance with the present invention will depend upon the shape of the computer which it is intended to cover and it should be understood that the cover shown in FIG. 1 is for the purposes of illustration only. Thus, the configuration of the cover may be varied, depending upon computer configuration, without departing from the present invention.

Figure 2:
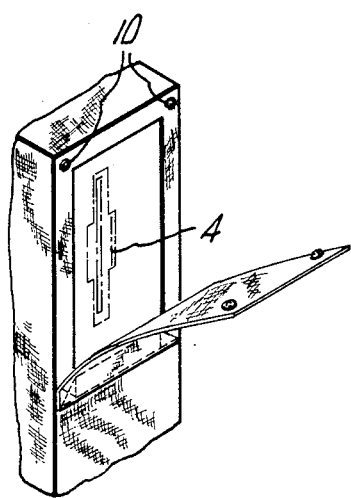
FIG. 2 is a partial view showing the flap in the open position with the disk drive access slot exposed.

As shown in FIG. 1, the computer cover has a front panel 2 having a flap 3 located therein. Flap 3 is capable of being opened as shown in FIG. 2 to expose disk drive access slot 4 in the computer so that a computer disk may be inserted (or removed). After insertion, the flap 3 may again be closed and detachably secured at fastening points 10, e.g., by a Velcro or other suitable connection, so that the access slot is no longer exposed and is protected by flap 3 from dust, liquid or other adverse conditions.

Figure 3:
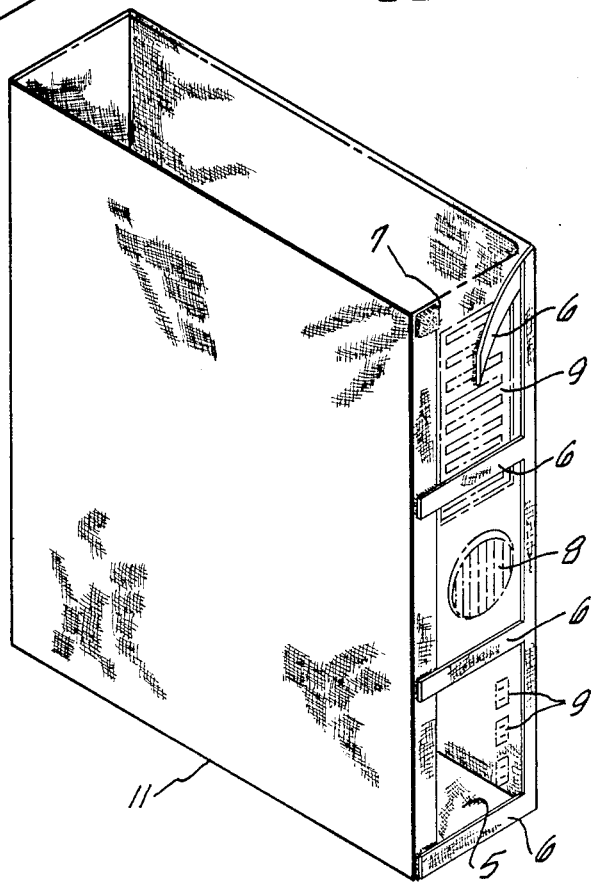
FIG. 3 is a back view showing openings for access ports and the vent for the computer's cooling fan.

As shown in FIG. 3, this embodiment of the computer cover has no back panel but rather has an open end 5 which is located on that side of the computer where the cooling fan vent 8 and the ports 9 for receiving cables are located. Thus, opening 5 permits the computer cooling fan to vent without substantial interference and provides access to the external ports of the computer so that cables for peripheral devices such as printers, monitors, etc. may be connected to the computer without difficulty. Preferably, straps 6 are provided in open end 5 which straps may be detachably secured, as at fastening point 7, to provide structural stability to the computer cover.

The cover 1 is preferably constructed from a light weight fabric which is resistant to water and other liquids and which is resistant to static charge as well. Even more preferably, the computer cover of this invention is prepared from a fabric woven from nylon threads which threads are coated with a static charge resistant material. Such fabric is readily available in the market.

Unlike other computer covers known to the art, the present cover is suited to remain in place while the computer is in operation and provides protection during the hours in which the computer is in use. Thus, this cover protects against inadvertent spills of coffee, water, soft drinks, etc. which are known to occur during computer use and which can seriously adversely affect the operation of a computer if such foreign materials penetrate beyond the shell of the computer. If such spills occur, the computer cover of the present invention can also be removed and washed or otherwise cleaned to remove the residue of such spills and then easily replaced on the computer.

It is to be understood that the computer cover of the present invention can be configured in accordance with any computer configuration. For example, in computers where disk drive access slots are located at some distance from each other, the computer cover may be provided with more than one flap. For each location where there is a disk access slot or a group of closely proximate disk access slot. Similarly, for computers where the cooling fan vent and the external ports are remote from each other, separate openings may be provided in the cover for each. In a preferred embodiment, the computer cover is manufactured with no side panel at location 11 so that it may be slid downwardly over a computer which stands on one of its narrow sides, e.g., the IBM PS/2.

Futhermore, various fabrics, woven or non-woven may be used to fabricate the computer of the present invention and the cover may also be fabricated from suitable porous films. The cover may, of course, be of any desired color or colors and is particularly suitable for displaying the name of the manufacture of the computer (or of the a vendor of computer supplies, etc.). Having described the foregoing specific embodiment of the invention, other and different embodiments will become apparent to those skilled in the art without departing from the scope of the present invention which is defined by the claims appended hereto.

What is claimed is

1. A protective cover for a computer which has a disk drive access slot, comprising a fabric member configured to conform to the general shape of the computer and which is sufficiently porous to permit effective heat dissipation and which is liquid resistant and static charge resistant, and at least one flap located in said member so as to permit access to the disk drive access slot which is capable of being closed after disk insertion or removal.

2. A protective cover for a computer which has a disk drive access slot, a cooling fan and at least one external port, comprising a fabric member configured to conform to the general shape of the computer and which is sufficiently porous to permit effective heat dissipation and which is liquid resistant and static charge resistant, at least one flap located in said member so as to permit access to the disk drive access slot and which is capable of being closed after disk insertion, and at least one opening in said member which is located so as to permit access to the external port and to permit the fan to vent without substantial interference.

3. The computer cover of claims 1 or 2 wherein said cover has more than one flap.

* * * * *